May 12, 1925.
J. G. BLUNT
LOCOMOTIVE DRIVING BOX
Filed May 14, 1924
1,537,062
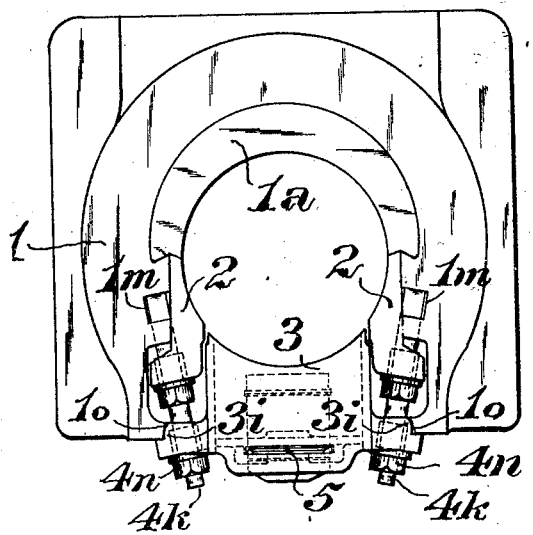
— FIG. 1 —
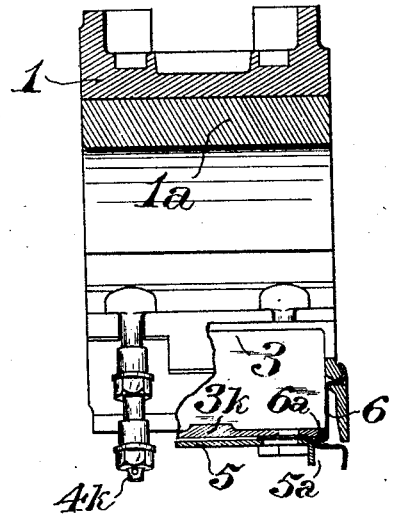
— FIG. 2 —
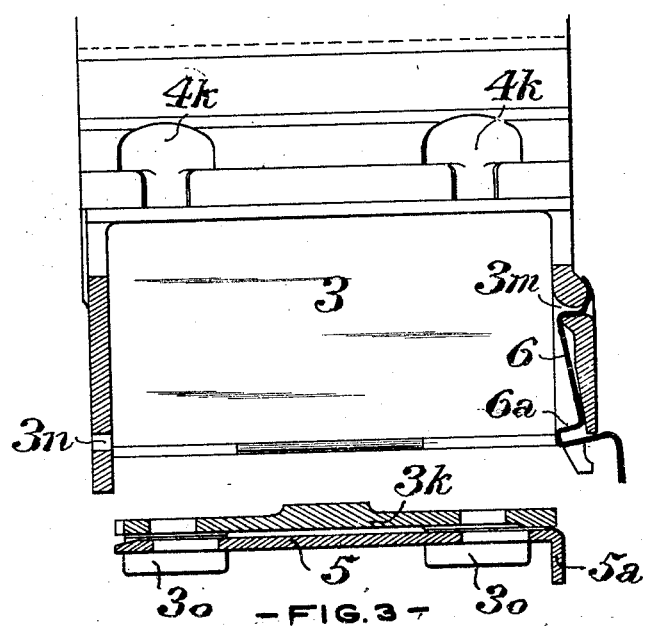
— FIG. 3 —
WITNESSES
A. S. Vanderbilt
S. R. Bell
INVENTOR
James G. Blunt,
by Herndon Bell Atty Patented May 12, 1925.

1,537,062

UNITED STATES PATENT OFFICE.

JAMES G. BLUNT, OF SCHENECTADY, NEW YORK.

LOCOMOTIVE DRIVING BOX.

Application filed May 14, 1924. Serial No. 713,212.

*To all whom it may concern:*

Be it known that I, JAMES G. BLUNT, a citizen of the United States, and a resident of Schenectady, in the county of Schenectady and State of New York, have invented a certain new and useful Improvement in Locomotive Driving Boxes, of which improvement the following is a specification.

My invention, while more particularly designed for application in three cylinder locomotives, is of equal applicability in those of the ordinary two cylinder type, and its object is to provide means, of simple and inexpensive construction, which may be readily manipulated, and which will enable the supply of lubricant to be renewed, as from time to time required, without necessitating the detachment and removal of the lubricant cellar from the driving box.

The improvement claimed is hereinafter fully set forth.

The renewal of lubricant to the bearings of the crank axles of three cylinder locomotives, has presented a difficult problem, inasmuch as the proximity of the crank discs to the driving boxes prevents the removal and replacement of lubricant cellars of the ordinary construction, in a horizontal direction. It therefore becomes necessary to depress the pedestal binder, sufficiently far to enable a grease cake to be slid or lifted into the cellar, horizontally, below the adjacent crank disc. My invention enables this operation to be readily and conveniently effected, by the provision of a lubricant cellar, the body of which is secured to the driving box, and the bottom of which is a separate removable member, securely connected to the body, while capable of being readily detached and dropped, for the insertion of lubricant.

In the accompanying drawings: Figure 1 is a front view, in elevation, of a locomotive driving box, illustrating an embodiment of my invention; Fig. 2, a vertical longitudinal central section through the same; and, Fig. 3, a similar section, on an enlarged scale, through the lubricant cellar, the bottom plate and latch being shown as dropped below the body of the cellar.

In the practice of my invention, referring descriptively to the specific embodiment thereof which is herein exemplified, the driving box, 1, is fitted with a crown brass, $1^a$, in the usual manner, and in the instance shown, is also provided with supplemental bearings, 2, which do not, however, form part of my present invention. A lubricant cellar, 3, is fitted between inclined faces, $1^o$, at the bottoms of the side walls of the driving box, abutting thereon by curved faces, $3^i$, and is secured to the driving box, by adjusting bolts, $4^k$, engaging lateral recesses, $1^m$, in the driving box, and passing through lugs on the lubricant cellar, said bolts having nuts, $4^n$, on their lower ends, bearing against the cellar.

The lubricant cellar, 3, is in the form of a casing of substantially rectangular longitudinal and transverse section, and having vertical side and end walls only, its lower side being closed by an independent bottom plate, $3^k$, which is insertible from below the cellar and is detachably connected to it by a horizontally sliding latch, 5, having a downwardly projecting arm, $5^a$, on one end. A horizontal slot, $3^m$, is formed in the inside end wall of the cellar, which wall is recessed below said slot to permit swinging movement of a plate spring, 6, the upper end of which is hooked into the slot, $3^m$, and which projects downwardly in the cellar, and is bent, near its lower end, to form a support, $6^a$, for one end of the bottom plate, $3^k$. The spring, 6, projects below the support, $6^a$, so as to provide a bearing for the application of the hand of the operator in swinging it outwardly. A horizontal slot, $3^n$, is formed in the end of the cellar which adjoins the wheel hub, for engagement by the latch, 5, when the bottom plate is supported in the position in service, as shown in Fig. 2. The latch, 5, slides between guides on the bottom plate, $3^k$.

In order to disconnect the bottom plate, $3^k$, from the body of the cellar, when desired, the lower end of the spring, 6, is pulled outwardly, after which the latch, 5, is pulled in the same direction, until it is disengaged from the slot, $3^n$, and the bottom plate may then be dropped straight downward. After placing a new grease cake on the bottom plate, said plate is inserted, from below, in the body of the cellar, the spring, 6, being pulled out sufficiently far to allow it to pass. When it has been brought to the proper height, the latch, 5, is engaged with the slot, $3^n$, by being pushed into it by the operator. The release of the spring, 6, exerts the pressure of the spring against the latch, maintaining it in engagement with the notch, $3^n$, and holding the bottom plate securely in position on the body of the cellar.

I claim as my invention and desire to secure by Letters Patent:

1. The combination of a locomotive driving box; a bottomless lubricant cellar, connected thereto; a bottom plate, insertible from below in said cellar; a latch, adapted to engage the body of said cellar and support one end of the bottom plate therein; and a spring, movable into and out of position to support the opposite end of the plate, and maintain the latch in engagement with the cellar.

2. The combination of a locomotive driving box; a bottomless lubricant cellar, a bottom plate, insertible from below, in said cellar; a latch, adapted to engage the body of said cellar and support one end of the bottom plate thereon; and a plate spring coupled to, and movable about, a bearing on the body of the cellar and carrying a support for the other end of the bottom plate and a stop for the latch.

JAMES G. BLUNT.

Witnesses:
 CHAS. M. BELL,
 J. HOWARD WAGAR.